(No Model.) 2 Sheets—Sheet 1.

G. A. W. ROBERTSON.
VEHICLE GEAR.

No. 436,264. Patented Sept. 9, 1890.

WITNESSES:
F. McArdle
C. Sedgwick

INVENTOR:
G. A. W. Robertson
BY
Munn & Co.
ATTORNEYS

THE NORRIS PETERS CO., PHOTO-LITHO., WASHINGTON, D. C.

(No Model.) 2 Sheets—Sheet 2.

G. A. W. ROBERTSON.
VEHICLE GEAR.

No. 436,264. Patented Sept. 9, 1890.

WITNESSES:
F. M. Ardle
C. Sedgwick

INVENTOR:
G. A. W. Robertson
BY
Munn & Co.
ATTORNEYS

UNITED STATES PATENT OFFICE.

GEORGE A. W. ROBERTSON, OF CHARLOTTETOWN, PRINCE EDWARD ISLAND, CANADA.

VEHICLE-GEAR.

SPECIFICATION forming part of Letters Patent No. 436,264, dated September 9, 1890.

Application filed March 8, 1890. Serial No. 343,102. (No model.)

*To all whom it may concern:*

Be it known that I, GEORGE A. W. ROBERTSON, of Charlottetown, in the county of Queens, Province of Prince Edward Island and Dominion of Canada, have invented a new and useful Improvement in Vehicle-Gears, of which the following is a full, clear, and exact description.

My invention relates to an improvement in two-wheeled vehicles, and has for its object to simplify the construction of the running-gear, and to so hang the body of the vehicle as to impart to it great delicacy of balance without inconveniencing the driver, and also to so construct and locate the springs that the body will be enabled to carry considerable weight without interfering with or destroying the sensitiveness of the springs.

A further object of the invention is to provide against horse motion, and to so hang the body that the weight, when placed in it, will be to a great extent distributed, thus insuring the body finding its own true balance, and also to provide for the driver a maximum degree of comfort in long journeys.

The invention consists in mechanism for imparting to the body a swinging or rocking motion, and in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1:
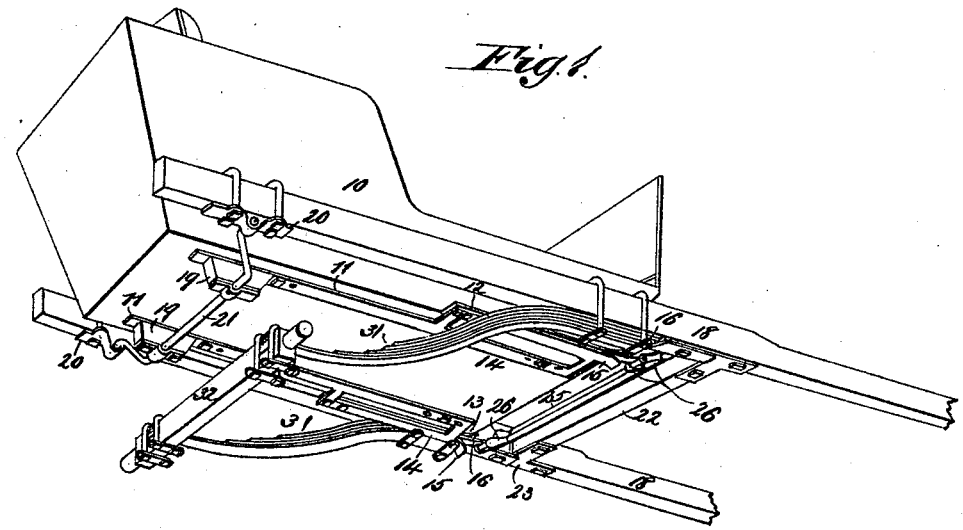
Figure 2:
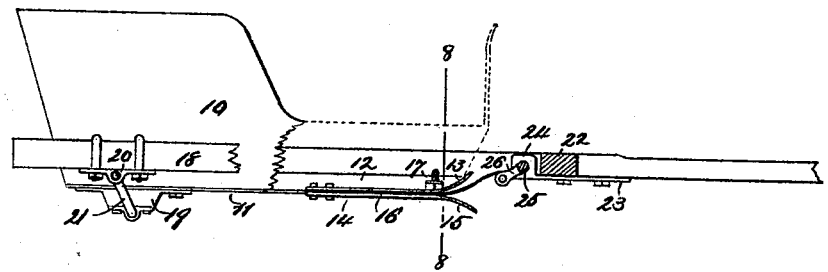
Figure 3:
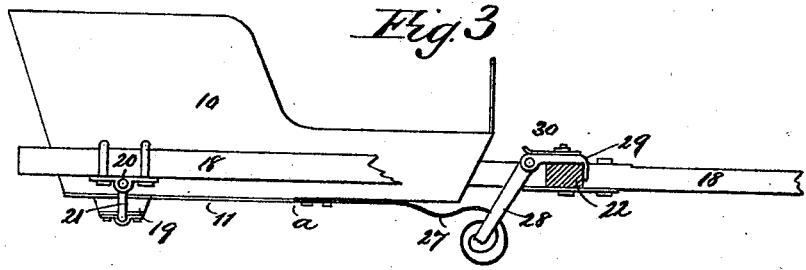
Figure 8:
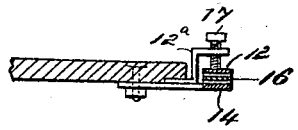
Figure 4:
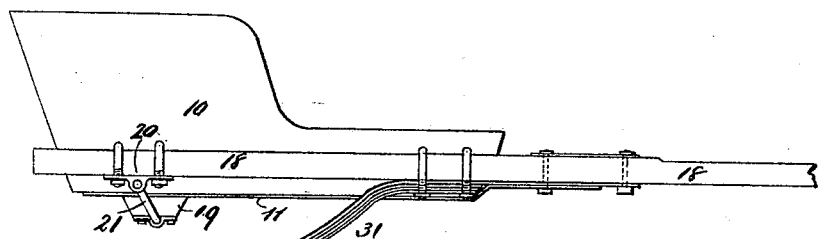
Figure 5:
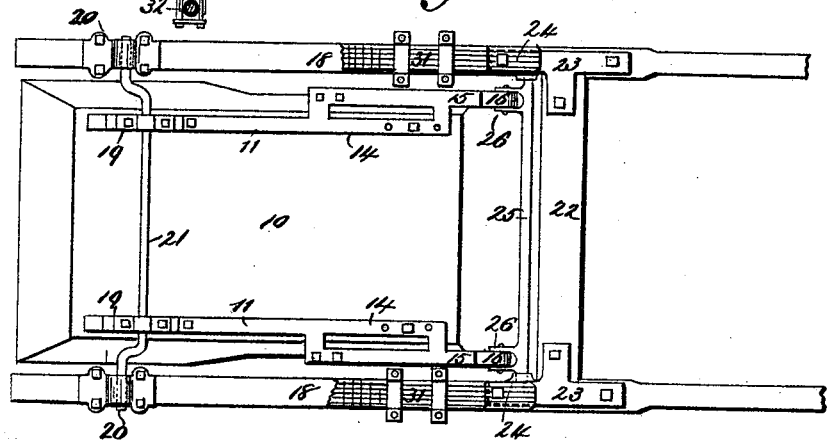
Figure 6:
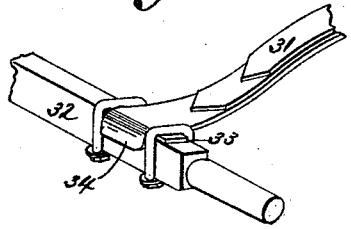
Figure 7:
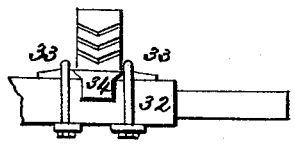

Figure 1 is an under side perspective view of the vehicle. Fig. 2 is a side elevation of the same, partially in section. Fig. 3 is a side elevation, one shaft being partially broken away, illustrating a slight modification in the running-gear. Fig. 4 is a side elevation of the vehicle, illustrating the application of the main spring to the shafts and to the axle. Fig. 5 is a bottom plan view of the vehicle and its running-gear, as illustrated in Figs. 1 and 2. Fig. 6 is a perspective view of one end of the axle, illustrating the manner of attaching the main spring thereto. Fig. 7 is a partial side elevation of the axle and end view of the spring, and Fig. 8 is a detail sectional view on the line 8 8 in Fig. 2.

Upon the bottom of the body 10 of the vehicle, at each side of the same, a longitudinal stay-plate 11 is firmly bolted, which stay-plate is provided with an integral skeleton rectangular section 14 at its forward end, the outer side bar of which section is carried beyond the sides of the bottom of the body, and the forward end of the outer side bar of said section 14 is projected beyond the cross-tie and curved downward, as illustrated at 15 in Fig. 2. Upon this outer side bar of the section 14 a spring-plate 12 is located, which plate is somewhat rocker-shaped, having its forward end bent upward or in a direction contrary to the projecting end 15 of the side bar, as illustrated at 13. The spring-plate 12 is preferably of equal width and length with the outer side bar of the plate-section 14, upon which it rests, and is secured to the said side bar at its rear end only. The spring-plate 12 and the outer side bar of the section 14 of the stay-plates are adapted to constitute buffers for a strap-spring 16, the rear end of this strap-spring being rigidly bolted between the rear ends of the buffers, and the forward end of the spring is made to project beyond the mouth of the buffers.

Upon the front cross-ties of the skeleton sections 14 of the tie-plates brackets 12$^a$ are secured, which extend over the upper spring-buffers 12, and in each of said brackets a set-screw 17 is located adapted for engagement with the spring of the upper buffer beneath it, whereby the distance between the flaring ends of the buffers may be increased or decreased to give the forward extremity of the spring more or less play, as occasion may demand. The flaring extremities of the buffers serve to limit the vertical movement of the springs 16. These springs 16 for convenience I denominate "buffer balance-springs."

The body of the vehicle is held to swing between two parallel shafts 18, and the said body is attached to the said shafts in the following manner: Upon the bottom of the body, preferably at the rear extremity of the stay-bars 11, bearing blocks or boxes 19 are secured, and opposite the said body-bearing blocks or boxes similar boxes 20 are attached in any suitable or approved manner to the under edge of the shafts 18 of the vehicle, and in the said bearing blocks or boxes 19 and 20 a crank-shaft 21 is journaled in such manner that the crank-arm thereof will have a forward inclination. Upon the under edge of each of the vehicle-shafts 18, near the cross-bar 22 thereof, a plate 23 is rigidly attached, which plate is provided with a socket-section 24, extending upward in contact with one side face of the shaft, preferably to the rear of the cross-bar 22, and in the said sockets 24 a rock-shaft 25 is journaled, which rock-shaft near its extremities is provided with two spaced lugs or ears 26, each pair of lugs or ears being connected by a suitable pin, and upon these pins the ends of the buffer balance-springs 16 are attached. As the body 10 rests upon the rear crank-shaft 21, and as the said crank portion of the shaft has a forward inclination, when the body is loaded with the driver, for instance, the buffer balance-springs 16 are brought in tension and pull against their connection with the forward rock-shaft 25 and prevent any rattling noise, and also impart to the hanging motion of the body during a journey great easiness and delicacy of balance, which is one of the especial objects of the invention.

In Fig. 3 I have illustrated a modification in which coil-springs 27 are substituted for the strap-springs 16. These coil-springs are made of flat steel, and are bolted at one end to the body stay-bars 11, which in this instance are straight at *a*—for instance, the said flat steel being made to diminish both in width and thickness toward the center of the coil, at which point it is fastened rigidly into shackles 28, the said shackles being pivoted at their upper ends to the forward edge of the strap-plates 29, rigidly attached to the cross-bar 22 of the shaft; and in order to prevent any rattling noise when the vehicle is driven over a rough road upon each strap-plate a spring 30 is attached, one end of which has a bearing upon the pivotal connection of the shackles with the said strap-plates. When the coil-springs are used, the crank-shaft 21 is not given a forward inclination, but is placed perpendicularly.

In addition to the buffer balance-springs I employ two main springs 31, which are located one at each side of the vehicle, consisting of a series of leaves, the forward ends of which main springs are clipped in any suitable manner to the shafts 18. The connection of said main springs with the axle 32 is, however, peculiar, and consists in forming horizontal ears 33 at each side of the lower leaf of the springs near their rear ends, which ears rest upon the top of the axle, and the clips are made to pass over said ears, as best illustrated in Figs. 6 and 7, and the rear extremity of the lower leaf of each main spring is curved downward, as illustrated at 34 in Figs. 6 and 7, between the clips to a firm bearing with the rear face of the axle.

The manner in which the body is hung gives it great delicacy of balance, and at the same time this tendency does not tend to intimidate the driver. The rear crank-shaft, sloping forward, causes the body when the driver takes his seat to draw upon the front buffer-springs, thus admitting of their being made very light and easy to bend.

It is obvious that the weight upon the said buffer-springs partakes more of the nature of a pull than a bearing, and that they will therefore carry considerable weight without resting against the top spring buffer.

The great objection in two-wheeled vehicles has been that the driver suffers from the noise of the gear-connections, as well as inequalities in the road, added to the horse motion. By the arrangement of the gear above described the said gear is rendered noiseless, and any wear of the parts is taken up by reason of the crank-shaft sloping forward and causing a lateral tension upon the connections at all times. Again, when at speed should the wheels strike an obstruction, the way on the vehicle is not checked, as the combination of the crank-shaft, the buffer balance-springs, and the forward rock-shaft permit the body to move forward, thus avoiding the shock which it would otherwise receive if the body were deprived of this swinging motion. The mode of hanging the body thus set forth has also a tendency to distribute the weight when placed in it, thereby rendering the body capable of finding its true balance and securing to the driver great easiness in a long journey. It matters not from what direction the shock is received, the body will yield; hence its extreme easiness. By reason of the combination of the crank-shaft, the rock-shaft, and buffer balance-springs, the body of the vehicle is allowed a rolling or rocking motion, as well as a swinging motion, as the weight is brought to bear on the front of the body, and as the crank-shaft moves forward the buffer-springs are curved around the upper buffer, thus increasing in strength as the weight is increased.

Having thus described my invention, I claim as new and desire to secure by Letters Patent—

1. In a wheeled vehicle, a volute spring diminishing toward the center of the coil, at which point it is rigidly secured to an arm or shackle projecting forward and upward and having an attaching strap-bar hinged to its upper end, substantially as set forth.

2. In a wheeled vehicle, the combination, with two buffing-plates having their extremities curved in opposite directions, of a balance buffer-spring attached at one extremity between the plates and having its opposite end carried outward between and beyond the curved extremities of the plates, and a regulating device having a bearing upon the upper buffer-plate, whereby the movement of the extending end of the spring may be limited, as desired.

3. In a wheeled vehicle, the combination, with the shafts, the body, and buffing-plates, one of which is a spring-plate attached to the body at each side near the forward end, the forward extremities of which buffing-plates are curved in opposite directions, of a rock-shaft journaled between the shafts, and a buffer balance-spring, rigidly secured at one end between the rear extremities of said plates, the opposite end of which spring is carried outward between the curved ends of the plates to a connection with the rock-shaft, substantially as shown and described, and for the purpose specified.

4. In a vehicle, the combination, with the shafts, a body suspended between said shafts, a rock-shaft journaled in the shafts in front of the body, and springs attached to the body at one end and to the rock-shaft at their other extremities, of a crank-shaft journaled in bearings attached to the shafts and body, the crank-arm of which shaft is given a forward inclination, substantially as shown and described, and for the purpose specified.

5. In a vehicle, the combination, with the shafts and a body suspended between the shafts, of springs attached at one end to the under side of the body near the forward end at the sides, and a connection between each of said springs and the shafts, and a crank-shaft journaled in bearings attached to the shafts and the body of the vehicle, substantially as shown and described.

6. In a vehicle of the character described, the combination, with the shafts and axle, of leaf-springs attached at their forward ends to the shafts, and provided at their rear ends with horizontal lugs capable of contacting with the upper surface of the axle, and with a rear extension capable of engaging with the side face of the axle, and clips embracing the said axle and bearing against the said lugs, substantially as shown and described, and for the purpose specified.

GEORGE A. W. ROBERTSON.

Witnesses:
A. A. McLEAN,
J. A. LONGWORTH.